United States Patent [19]
Skarbo et al.

[11] 3,867,506
[45] Feb. 18, 1975

[54] COBALT STRIPPING FROM OXIMES

[75] Inventors: Roald R. Skarbo, Lexington, Mass.;
Walter E. Galin, Pawtucket, R.I.;
David L. Natwig, Brighton, Mass.

[73] Assignee: Kennecott Copper Corporation, New York, N.Y.

[22] Filed: July 19, 1973

[21] Appl. No.: 380,793

[52] U.S. Cl................ 423/139, 75/101 BE, 75/119, 423/24
[51] Int. Cl....................... B01d 11/00, C01g 51/00
[58] Field of Search........ 423/139; 75/101 BE, 119, 75/117

[56] References Cited
UNITED STATES PATENTS

| | | | |
|---|---|---|---|
| 3,193,381 | 7/1965 | George et al. | 75/119 X |
| 3,276,863 | 10/1966 | Drobnick et al. | 423/139 X |
| 3,380,801 | 4/1968 | Williams et al. | 75/119 X |
| 3,432,257 | 3/1969 | Spitzer et al. | 75/101 BE X |
| 3,743,585 | 7/1973 | Lowenhaupt et al. | 75/119 X |
| 3,752,745 | 8/1973 | Kane et al. | 423/139 X |

*Primary Examiner*—Oscar R. Vertiz
*Assistant Examiner*—Brian E. Hearn
*Attorney, Agent, or Firm*—Lowell H. McCarter; John L. Sniado; Jerry Cohen

[57] ABSTRACT

Cobalt is removed from an oxime solution by contact with a mixture of sulfuric acid and glacial acetic acid or lower alkanol. During contact the cobalt is released by the oxime to the acid solution where it remains as the organic and acid phases are allowed to separate.

10 Claims, 1 Drawing Figure

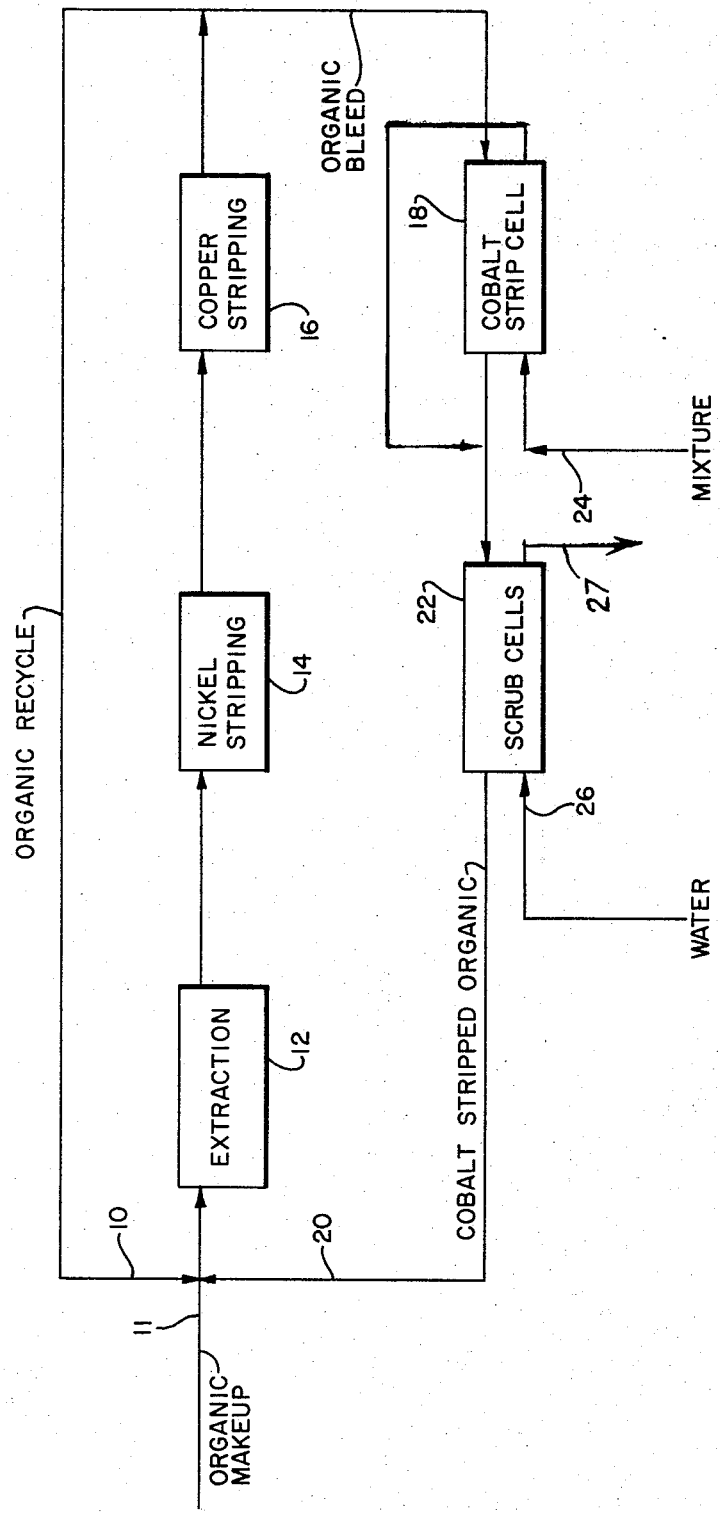

COBALT STRIPPING FROM OXIMES

CROSS REFERENCE TO RELATED APPLICATIONS

Related applications, Serial No. 266,981 filed June 28, 1972, Ser. No. 266,985 filed June 28, 1972, Ser. No. 380,792 filed of even date herewith of Roald R. Skarbo, and Ser. no. 266,986 filed June 28, 1972, and Ser. No. 317,003 filed Dec. 20, 1972, of Roald R. Skarbo et al. describe recovery of copper and nickel by loading of an organic phase with metal values and the subsequent stripping procedure. This application describes a method to prevent cobalt poisoning of the organic phase by stripping cobalt metal from the organic phase. Cobalt stripping is also disclosed in copending application Ser. No. 380,790 of even date herewith by Roald R. Skarbo. All said applications are of common assignment with this application. The disclosures of said applications are incorporated herein by reference as though set out at length herein.

BACKGROUND OF THE INVENTION

The present invention relates to the prevention of cobalt poisoning of oximes in liquid-liquid extraction processes.

Oximes are currently used in solvent extraction of metal values, including copper, nickel and cobalt, from leach solutions containing the metals. The extraction process involves ion exchange, wherein an exchangeable hydrogen ion of the oxime molecule is exchanged for the metal ion in the leach solution.

Acid stripping of the organic extractant with mineral acids is used for removing the copper and nickel from the organic extractant, but cobalt is not stripped satisfactorily by treatment with the mineral acids.

The use of organic oximes for liquid extraction of copper and nickel from ammoniacal Cu—Ni—Co solutions normally results in coextraction of small amounts of cobalt. Unlike copper and nickel, however, cobalt is not stripped from the organic by treatment with mineral acids. Consequently as the organic is recycled to extract additional copper and nickel in a continuous production process, the quantity of cobalt increases until the organic's ability to extract the other metals is drastically reduced. This build up of cobalt in the liquid organic is known as cobalt poisoning.

The copper and/or nickel stripped organic extractant is recycled for further extraction and stripping repeatedly and over the course of repeated recycling will accumulate cobalt values which poison the extractant by increasingly preempting the available coordinately bonded ion exchange sites within the oxime molecule. Disposal rather than repeated use of the oxime would add substantial operating cost to the extraction process as a whole.

It is therefore an important object of the present invention to provide an effective cobalt stripping process.

It is a further object of the invention to strip cobalt at ambient temperature consistent with one or more of the preceding objects.

It is a further object of the invention to provide strip efficiency on the order of 95 percent or higher.

It is a further object of the invention to maintain organic yield from each extraction/stripping recovery cycle on the order of 98–99 percent or higher consistent with one or more of the preceding objects.

SUMMARY OF THE INVENTION

A cobalt stripping process according to the invention comprises contacting a cobalt-containing oxime with a mixture of:

a. a first component comprising concentrated sulfuric acid and b. a second component which is a good solvent for oximes and is preferably selected from the group consisting of glacial acetic acid, methanol and lower alkanols. The volume ratio of the first component to the second component is from 1:5 to 1:200 where glacial acetic acid is used as the second component and from 1:5 to 1:50 where methanol is used as the second component. The volume ratio of organic to be stripped to acid stripping mixture is from 0.1 to 10. Concentration of the components of the mixture is selected to provide a water content of less than about 5 percent by weight.

The acidic stripping mixture dissolves the oxime leaving its kerosene or other oil carrier as a separate phase. It has been discovered that the dissolved cobalt loaded oxime readily releases its chelated cobalt ions to the acidic stripping mixture. The cobalt is removed and the stripping step concluded by adding water to reduce the solubility of oxime in the acidic mixture. The stripped oxime can then be separated from the added water and acidic mixture and returned to its original oil carrier. The cobalt and acidic mixture can be recovered from the added water by known means.

Other objects, features, and advantages of the invention will be apparent from the following detailed description with reference therein to the accompanying drawing the single figure of which

BRIEF DESCRIPTION OF THE DRAWING

The drawing is a block diagram of a process according to a preferred embodiment of the invention.

DETAILED DESCRIPTION OF PREFERRED EMBODIMENTS

Referring now to the single FIGURE of drawing there is shown a typical continuous production process using the present invention wherein a recirculating flow loop 10 passes an oxime in kerosene through one or more extraction stages for each of nickel and copper to pick up nickel and copper values, respectively from an aqueous phase source thereof (not shown) passing in countercurrent or cross-current relation to the organic phase; through one or more nickel stripping stages 14 to surrender nickel values to an aqueous strip phase (not shown); through one or more copper stripping stages 16 to surrender copper values to an aqueous strip phase (not shown); and then back to extraction by recycling through loop 10 with a small portion (about 1/1000) bled off to recycle through loop 20. In loop 20, the bled organic passes through one or more cobalt strip cells (preferably one) in countercurrent relation to the acidic stripping mixture described below which is fed in at 24 and then the organic passes through one or more (usually 2–4) scrub cells 22 in countercurrent relation to water which is fed in at 26 to cause redissolution of oxime in kerosene as described below after initial separation of oxime from its kerosene carrier in the presence of nonaqueous acidic mixture in apparatus 18. The cobalt and acid are carried off with the water at 27.

The oximes which may be treated beneficially by this process and other details of continuous processing including flow rates and variations of apparatus used are described in the above cited copending applications, particularly those filed of even date herewith, directly and/or by reference to the literature of current practice and publicly available apparatus and materials.

In practicing the process of invention according to a first preferred embodiment thereof, the oxime, usually in solution with kerosene, is treated with an acidic mixture of glacial acetic acid and concentrated sulfuric acid in a volume ratio of from 5 parts acetic acid to 1 part $H_2SO_4$ up to 200 parts acetic acid to 1 part $H_2SO_4$. By contacting the organic and aqueous phases, the oxime extractant dissolves in the acid phase, leaving essentially pure kerosene as a separate phase. While dissolved in the acid mixture the organic releases the cobalt by some unknown mechanism. Transfer of the organic back to the kerosene phase is then accomplished by addition of water which causes the organic to be insoluble in the acid. The regenerated organic can then be recycled to extract additional metal and, if desired, the cobalt may be recovered from the acid by known means.

The presence of $H_2SO_4$ even in small volumes appear to be necessary to obtain noticeable stripping of the cobalt and also for complete dissolution of the organic in the acetic acid.

Although acetic acid-sulfuric acid is not the only available mixture, it is effective at ambient temperatures and with contact times of 2–5 minutes. The ratio of organic to acid is preferably 1:1 with a ratio in excess of unity causing a decrease in strip efficiency and a ratio of less than unity causing an increase in cost due to the expense of acetic acid.

Table I, below, shows the strip efficiency with a starting solution of 92 mg. cobalt per liter for varying ratios of organic to acid (hereafter O/A ratio). The results are indicated for a single stage strip process although a multistage strip circuit can be used at similar efficiencies using O/A ratios considerably higher than unity.

During regeneration, the organic seems to undergo some degradation so that upon recycle it is not able to extract as much metal as in the previous cycle. This degradation may be expressed in terms of the capacity loss and is determined from the change in the organic's ability to accept copper ions.

The expression used is

Capacity Loss = $[Cu]_{fo} - [cu]_{So} - [Co]_{So} \times 63.54/58.93$ where $[Cu]_{fo}$ = Cu loading capacity (e.g.mg/l of fresh organic
$[Cu]_{So}$ = Cu loading capacity of stripped organic
$[co]_{So}$ = Co content of stripped organic.

The final term adjusts the result to account for the unstripped cobalt ions which occupy sites in the used organic formerly available for copper ions. The term is reduced in proportion to the atomic weights of Cu and Co. The magnitude of the capacity loss on the first recycle using acetic acid —$H_2SO_4$ is about 2.5 percent if the organic is scrubbed with sulfuric acid to remove any dissolved acetic acid which may adversely affect the loading capacity.

TABLE I

| Strip O/A Ratio | Co in Organic After Stripping (mg/l) | Strip Efficiency % |
| --- | --- | --- |
| 1.67 | 11.5 | 87.5 |
| 1.0 | 7.0 | 92.4 |
| 0.5 | 5.7 | 93.8 |
| 0.33 | 5.3 | 94.2 |
| 0.25 | 4.5 | 95.1 |
| 0.17 | 3.1 | 96.6 |

Mixtures of methanol and sulfuric acid in volume ratios of 5 to 50 (methanol/$H_2SO_4$) may replace the acetic acid/$H_2SO_4$ mixture in the stripping process using the same process steps as outlined above. The cost of methanol versus the cost of acetic-acid makes this substitution attractive although a relatively long contact time, high acid concentrations and the use of elevated temperatures may be necessary for satisfactory stripping. Comparison of the strip efficiencies of methanol/$H_2SO_4$ in volume ratios of 5 and 10 and the effect of elevated versus ambient temperatures are shown in Table II below.

TABLE II

Stripping of Co from 40% Volume % Organic Using Methanol/$H_2SO_4$ as Strip Solution

| Methanol: $H_2SO_4$ Volume Ratio | Temp. (°C) | Co in Organic before Stripping (mg/l) | Co in Organic after Strip. (mg/l) | Strip. Efficiency (%) |
| --- | --- | --- | --- | --- |
| 5 | 24 | 1012 | 128 | 87.4 |
| 5 | 45 | 716 | 36 | 95.0 |
| 5 | 65 | 820 | 68 | 91.7 |
| 10 | 24 | 1012 | 184 | 81.8 |
| 10 | 45 | 1012 | 112 | 88.9 |

The tests were run on a 40 percent organic/60 percent kerosene solution loaded with about 1 g/l cobalt, which is a typical concentration to be used in practice. At ambient temperatures and O/A ratio of 1, a contact time of 30–45 minutes may be necessary for complete stripping. Elevated temperatures (e.g. 45° C) and lower O/A ratios can be expected to decrease the contact time considerably.

While methanol/$H_2SO_4$ is the preferred alcohol/acid to be used as a strip solution still other lower alcohols and mineral acids may be employed in practicing the invention. Representative are ethyl, propyl and butyl alcohols and hydrochloric and nitric acids.

The practice of the invention is further illustrated by the following non-limiting examples:

EXAMPLE 1 [O/A = 0.5]

1,000 ml of 40 percent LIX-64N in kerosene containing 92 mg Co was added to a 2,000 ml solution containing 1,920 ml glacial acetic acid and 80 ml conc. sulfuric acid. The mixture was held in a separatory funnel for several minutes until the phases separated. 1 liter of water was than added and thoroughly mixed in the funnel. The organic phase was then drawn off. Analysis showed Co concentration in the organic was reduced to 3.4 mg indicating a strip efficiency of 96.3 percent.

EXAMPLE 2 [O/A = 0.5]

Increased volume ratios of sulphuric acid resulted in higher strip efficiency. Process and conditions were exactly as stated in Example 1, except that the volume ratio of acetic acid/$H_2SO_4$ was reduced to 6.5 from 24. This increased sulfuric acid caused 97.4 percent of the cobalt to be stripped and higher sulfuric acid concentration had the effect of partially breaking down the organic (so that it must be replaced more often).

EXAMPLE 3 [O/A = 1.0]

Increased O/A ratio decreased strip efficiency. Using the process of Example 1 acetic acid and sulfuric acid in volume ratio of 14 were used to strip cobalt from General Mills LIX-64N. Use of a 5 minute contact time was found to strip 94.5 percent of the cobalt at ambient temperatures.

EXAMPLE 4 [O/A = 1.0]

A methanol-$H_2SO_4$ mixture in a volume ratio of 10 was necessary to strip organic at ambient temperature. 990 ml of 40 percent LIX-64N – 60 percent kerosene, containing 1,065 mg/l Co was added to a solution containing 900 ml methanol and 90 ml concentration $H_2SO_4$. The mixture was stirred for 30 minutes and then transferred to a separatory flask where the LIX-kerosene phase was allowed to separate from the alcohol-acid phase. After phase separation, chemical analysis revealed the LIX-kerosene phase to contain 158 mg/l Co or 15 percent of the original load.

EXAMPLE 5 [O/A = 1.0]

A methanol-$H_2SO_4$ mixture in volume ratio of 5 is a satisfactory strip solution at elevated temperature. The procedure was as described in Example 4 except that the reaction mixture was heated under reflux and stirred for 30 minutes before phase separation in the separatory funnel. Temperature was held between 45° C.

At 45° C, volume ratio of 5, strip efficiency was 95.0 percent showing a marked increase over ambient temperature results.

EXAMPLE 6 [O/A = 0.5]

At ambient temperature, lower methanol/$H_2SO_4$ ratios, lower O/A ratios and longer contact times are necessary to obtain stripping results comparable to those obtained at elevated temperatures.

To obtain results on the order to 95 percent strip efficiency, a 1:1 ratio of methanol/$H_2SO_4$ and a contact time of 45 minutes was required.

It should be noted again that while a high $H_2SO_4$ concentration increases strip efficiencies, it also has a tendency to degrade the organic which results in the loading capacity loss.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, and/or possessed by, the apparatus and techniques herein disclosed and limited solely by the scope and spirit of the appended claims.

What is claimed is:

1. Cobalt stripping process for removing chelated cobalt ions from oxime metal extractants in oil carrier comprising
   contacting an oxime in oil carrier with an acidic mixture in liquid form consisting essentially of:
   a. as a first component, aqueous sulfuric acid solution in a concentration of at least 90 percent by weight,
   b. and as a second component a solvent selected from the class consisting of lower alkanols and glacial acetic acid and having the characteristic of dissolving oxime out of the oil at water concentrations less than 5 percent and separating oxime out of the mixture at water concentrations above about 5 percent while retaining the cobalt therein,
   the first component to second component volume ratio being no greater than 1:5,
   and wherein said mixture has a water concentration below 5 percent, and further comprising,
   adding water to said mixture contacted oxime after the contacting step to raise water concentration above 5 percent, and
   recovering cobalt and said components from the water.

2. Cobalt stripping process in accordance with claim 1 wherein
   said oil is separated out between said contacting and water adding steps.

3. Cobalt stripping process in accordance with claim 1 in combination with
   the steps of extracting cobalt and metal values selected from the group consisting of copper and nickel from a leach liquor containing said cobalt as an incidental impurity along with said other metal values by contact with said oxime prior to said strip contacting step,
   stripping said other metals and recycling a major portion of the extractant back to the extraction step,
   bleeding off a minor portion of the extractant and processing it through said contacting step and then returning it to said extraction step.

4. Process in accordance with claim 3 carried out repetitively with recycle use of said mixture.

5. Cobalt stripping process in accordance with claim 1 wherein
   said second component comprises glacial acetic acid.

6. Cobalt stripping process in accordance with claim 5 wherein
   the volume ratio of the first to second components is at least 1:200.

7. Cobalt stripping process in accordance with claim 1 wherein
   said second component comprises methanol.

8. Cobalt stripping process in accordance with claim 7 wherein
   the volume ratio of the first to second components is at least 1:50.

9. Cobalt stripping process in accordance with claim 1 carried out at ambient temperature and an O/A ratio of 0.1 to 1.0.

10. In a process process for extracting and stripping a metal selected from the class consisting of copper and nickel from feeds containing incidental cobalt impurities comprising,
    extracting said metal values from said feed by contact with an oxime-oil mixture to effect ion exchange therebetween whereby said metal values and cobalt are transferred to the oxime and chelated thereby,
    stripping said metal values from the oxime by contacting the oxime-oil mxiture with a mineral acid, recycling the oxime for reuse in said extraction but bleeding off a minor portion of said oxime in a repeating closed loop the improvement comprising, selectively solving the oxime, and cobalt contained therein, of said bled off portion of oil-oxime mixture by contacting said portion with a highly concentrated aqueous solution of sulfuric acid and an organic material which dissolves the oxime and then adding water in at least one scrubbing step to remove the oxime from said aqueous solution while retaining cobalt in said aqueous solution and returning the cobalt-freed oxime and oil of the bled off portion to said repeating closed loop, whereby cumulative cobalt poisoning of oxime in said loop is abated.

* * * * *